United States Patent
Sikharulidze

(10) Patent No.: US 7,430,030 B2
(45) Date of Patent: Sep. 30, 2008

(54) BISTABLE NEMATIC LIQUID CRYSTAL DISPLAY DEVICE

(75) Inventor: David Sikharulidze, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 338 days.

(21) Appl. No.: 11/114,449

(22) Filed: Apr. 26, 2005

(65) Prior Publication Data

US 2005/0243264 A1  Nov. 3, 2005

(51) Int. Cl.
*G02F 1/1337* (2006.01)
(52) U.S. Cl. .................. 349/125; 349/177; 349/130; 349/132; 349/123
(58) Field of Classification Search ............ 349/123, 349/127, 128, 130, 132, 125, 177, 129
See application file for complete search history.

(56) References Cited

U.S. PATENT DOCUMENTS

| | | | | |
|---|---|---|---|---|
| 5,668,616 A | * | 9/1997 | Nakamura et al. | 349/128 |
| 5,729,320 A | * | 3/1998 | Eidenschink et al. | 349/166 |
| 5,885,343 A | * | 3/1999 | Cernigliaro et al. | 106/482 |
| 5,956,113 A | * | 9/1999 | Crawford | 349/185 |
| 6,249,332 B1 | * | 6/2001 | Bryan-Brown et al. | 349/129 |
| 2004/0144953 A1 | * | 7/2004 | Sikharulidze | 252/299.01 |
| 2005/0206831 A1 | * | 9/2005 | Sikharulidze | 349/177 |

FOREIGN PATENT DOCUMENTS

GB  2394781  5/2004

* cited by examiner

*Primary Examiner*—Thoi V Duong

(57) ABSTRACT

A bistable nematic liquid crystal display device comprises two opposed cell walls enclosing a layer of a nematic liquid crystal material. An inner surface of each cell wall is provided with an electrode for applying an electric field across at least some of the liquid crystal material. An inner surface of one of the cell walls is provided with a surface alignment capable of inducing a desired alignment in adjacent molecules of the liquid crystal material, and a layer of finely-divided particles is immobilized on the surface alignment.

20 Claims, 6 Drawing Sheets

BISTABLE NEMATIC LIQUID CRYSTAL DISPLAY DEVICE

This application claims priority to co-pending United Kingdom patent application number 0409683.0 filed on Apr. 30, 2004, which is entitled "BISTABLE NEMATIC LIQUID CRYSTAL DISPLAY DEVICE", the disclosure of which is incorporated herein by reference.

FIELD OF THE INVENTION

This invention relates to bistable nematic liquid crystal display devices.

BACKGROUND OF THE INVENTION

Pixel bistability is a desirable attribute for a liquid crystal display ('LCD') because this eliminates the need constantly to refresh the display or to employ a silicon memory device behind each pixel, which becomes prohibitively expensive as the number of pixels increases. With bistability, only pixels that need to be changed need addressing, and simple matrix addressing may be employed.

Bistable LCDs are known which employ chiral tilted smectic liquid crystals, for example chiral smectic C materials, which exhibit ferroelectricity. However, there are many problems with ferroelectric LCDs, including a paucity of stable, room-temperature materials, wide-temperature-range materials, and structural defects which result from mechanical stress. Because of the problems associated with ferroelectric smectic materials it is desirable to fabricate bistable LCDs using nematic liquid crystals ('LC').

U.S. Pat. No. 4,333,708 discloses a multistable nematic LC device in which switching between stable configurations is by the movement of disclinations in response to electric fields.

In WO 91/11747 and WO 92/00546 it is proposed to provide a bistable surface by careful control of the thickness and evaporation of SiO coatings. A first stable planar orientation of the director could be obtained, and a second stable orientation in which the director is at an azimuthal angle (in the plane of the surface) of 90° to the first orientation in the plane of the surface, and tilted by around 30°.

In "Mechanically Bistable Liquid-Crystal Display Structures", R N Thurston et al, IEEE Trans. on Elec. Devices, Vol. ED-27, No. 11, Nov. 1980, there are described two bistable nematic LC modes which are called "vertical-horizontal" and "horizontal-horizontal". In the vertical-horizontal mode, both cell walls are treated to give a roughly 45° tilt which permits the directors to be switched between two states in a plane which is perpendicular to the major surfaces of the device. In the horizontal-horizontal mode, the director is switchable between two angles in a plane parallel to the major surfaces of the device.

A bistable nematic display using monostable surface switching has been proposed by I. Dozov et al, *Appl. Phys. Lett.* 70 (9), 1179, 3 Mar. 1997. Switching in a thin cell is achieved between a low twist and a high twist state by the application of short electric pulses. Both cell wall surfaces have planar anchorings. Hydrodynamically coupled breaking of both anchorings results in the high twist state, and breaking only one anchoring results in the low twist state.

Polarity-sensitive switching has been found in a nematic LC-polymer mixture: R. Bartolino et al, *J. Appl. Phys.* Vol. 85 No. 5, 2870, 1 Mar. 1999. An LC/prepolymer mixture is polymerised in a cell so as to produce a gradient of concentrated polymer across the cell. It is thought that an asymmetric space charge distribution causes asymmetric electro-optical behaviour. A strong negative current produces a scattering (bright) state, and a weak positive current permits a transition to a homeotropic (dark) state.

U.S. Pat. No. 5,796,459 describes the use of a bigrating alignment structure which induces bistable surface states with different azimuthal orientations.

WO 97/14990 and WO 99/34251 describe the use of a monograting surface with a homeotropic local director, which has two stable states with different tilt angles within the same azimuthal plane. The homeotropic alignment is achieved by creating the monograting in a layer of material which causes spontaneous homeotropic orientation or, more practically, by coating the grating surface with a homeotropic inducing alignment agent such as lecithin. This grating surface is used to form a Zenithal Bistable Device or ZBD.

A bistable nematic device is described EP 1 139 151, wherein one cell wall is provided with an array of upstanding features which have a shape and/or orientation to induce the local director to adopt two different tilt angles in substantially the same azimuthal direction. The arrangement is such that two stable molecular configurations can exist after suitable electrical signals have been applied. The features are typically microscopic posts, used to form a Post-Aligned Bistable Nematic device, or PABN.

Typically the depth of gratings or post alignment features of the ZBD or PABN devices is about 1 µm and the ratio depth/width is about 0.6. Gratings this deep are fairly challenging to replicate by mass manufacturing methods.

Bistable nematic displays have been described in which the nematic LC has dispersed in it nanoparticles which are believed to form structures that stabilise the LC in either a scattering state or a homeotropic (non-scattering) state. Switching between the states is achieved either by two-frequency addressing or by the action of a laser. Two frequency-addressable displays are described in: R. Eidenschink, W. H. De Jue "Static scattering in filled nematic: new liquid crystal display technique" *Electronics Letters* 20 Jun. 1991, vol. 27, No. 13, pp 1195-1196, A. Gluschenko et al "Memory effect in filled nematic liquid crystals" *Liquid Crystals*, 1997, vol. 23, No. 2, pp 241-246, and M. Kawasumi et al "Nematic liquid crystal/clay mineral composites" *Minerals Science and Engineering* C6 (1998), pp 135-143. Laser-writable displays are described in U.S. Pat. No. 5,532,952 and M. Kreuzer et al "New liquid crystal display with bistability and selective erasure using scattering in filled nematics" *Appl. Phys. Lett.*, 62(15), 12 Apr. 1993, pp 1712-1714. A study of particle dynamics in such systems is presented in S. Lee et al "Dynamic behaviour of silica particles in liquid crystals under an ac applied voltage" *Proc. of 13$^{th}$ Intern. Conf. on Dielectric Liquids*(ICDL '99), Nara, Japan, Jul. 20-25, 1999, pp 571-574.

Problems of two-frequency addressing include a paucity of suitable materials and increased complexity of the drive electronics. Laser-writable devices are costly and complex to manufacture, and the use of both heat and voltage to switch the LC is undesirable.

SUMMARY OF THE INVENTION

According to an aspect of the present invention there is provided a bistable nematic liquid crystal display device comprising:
　　a first cell wall and a second cell wall enclosing a layer of nematic liquid crystal material;
　　at least one electrode on each cell wall for applying an electric field across at least some of the liquid crystal material;

a first surface alignment on an inner surface of at least part of the first cell wall for inducing adjacent molecules of the liquid crystal material to adopt a desired orientation; and a layer of solid particles secured over the first surface alignment on an inner surface of the first cell wall;

whereby the nematic liquid crystal material will adopt a first stable molecular configuration in response to a first pulse of a unidirectional electric field of suitable magnitude and duration and will adopt a second stable molecular configuration in response to a second pulse of unidirectional electric field of suitable magnitude and duration and opposite polarity to the first pulse, the second configuration being different from the first configuration.

A surface alignment may be provided on an inner surface of each cell wall. Where two alignments are provided, these preferably tend to induce different local alignments of molecules of the liquid crystal material.

The particles which form the layer or network are in a finely divided state prior to becoming fixed or deposited on the cell wall. The particles preferably have a size in the range 1 nm to 1000 nm, notably 1 to 500 nm. A particularly preferred size range is 5 to 50 nm. Suitable particles will be referred to herein as nanoparticles. The nanoparticles may be spherical or spheroidal.

For appropriate density and thickness conditions of the nanoparticles network the LC will initially be aligned under the influence of the alignment layer on the surface to which the network is secured, for example a planar alignment layer. Under an applied unipolar pulse the LC molecules will be reorientated vertically (for a liquid crystal with positive dielectric anisotropy). Because the nanoparticles are fixed in a layer or network they do not migrate along the cell under the influence of the electric field. Without wishing to be bound by theory, we believe that bistable switching is provided by the reorientation of the LC molecules inside the nanoparticles network and by the appropriate bonding of the electrically polarised LC molecules with the charged nanoparticles. The appropriate polarity of applied pulse will favor this bonding process, and a pulse of the opposite polarity will break these bonds and the LC molecules will be forced to align under the influence of the alignment layer. In this case, the switching does not involve an electromigration of charged nanoparticles across the cell and the switching parameters will be determined as in a pure nematic LC: $t_{on} \sim \gamma_{lc}/K\Delta\epsilon\, E^2$, $t_{off} \sim \gamma_{lc} d^2$, $\gamma_{lc}$-viscosity of pure LC with nanoparticles, which is less than $\gamma m$. (see below).

In cells where the nanoparticles are free to migrate (which are not part of the present invention), the switching parameters are given by:

electromagration time $t=d^2/\mu V$, where d-thickness of the cell, $\mu$-mobility of the charged nanoparticles, V—applied voltage. Also, doping of the LC with nanoparticles can increase viscosity of LC, which increases switching time: $t_{on} \sim \gamma_m/K\Delta\epsilon\, E^2$, $t_{off} \sim \gamma_m d^2$, $\gamma_m$-viscosity of mixture of LC with nanoparticles, K-elastic constant, $\Delta\epsilon$—dielectric anisotropy of LC.

The invention provides polarity-controlled switching because of the nature of the interactions between the particles network and the LC molecules and may be applied to LC cells with a range of alignment configurations. Such configurations include planar alignments on both inner surfaces (parallel, antiparallel, or non-parallel), homeotropic alignment on both inner surfaces, planar alignment on one inner surface and homeotropic alignment on the other inner surface.

The network is thin and porous so that it may be permeated by molecules of the liquid crystal material. The network may be formed on a cell wall surface, on top of the alignment layer, followed by assembly of the cell and subsequent filling with the liquid crystal material. Known methods of filling, spacing and sealing the cell may be employed.

The liquid crystal material may have positive or negative dielectric anisotropy, depending on the orientation which is desired to be achieved under an applied field. For the exemplified devices it is preferred that the LC has positive dielectric anisotropy.

The device preferably includes means for optically distinguishing between the first and second molecular configurations. Suitable means are well known from conventional LCD technologies and include, for example: one or more polarisers, or a pleochroic dye dissolved in the liquid crystal, optionally with a polariser. However, the device may be manufactured and sold without means for distinguishing the configurations where means such as polarisers may later be affixed by a purchaser.

The nanoparticles are preferably present in an amount of from 0.1 to 25% by weight of the composition comprising the liquid crystal material and the nanoparticles. A particularly preferred range is 0.5% to 15%, notably 1 to 5%.

Drive electronics may be used to provide unidirectional (DC) pulses of appropriate magnitude, duration and polarity, in accordance with input data information. Suitable drive electronics will be well known to those skilled in the art of electronics. It will be understood that the pulses may be of constant field strength or may have an AC component, providing that the overall field strength is sufficient to effect the switching to a stable state. Any desired addressing arrangement may be employed; for example, a matrix of x electrodes on one cell wall and y electrodes on the other, the electrodes being elongate strips arranged at 90° to each other.

Other aspects and benefits of the invention will appear in the following specification, drawings and claims.

The invention will now be further described, by way of example only, with reference to the following drawings.

DETAILED DESCRIPTION

In the following description concentrations are by weight percent (w/w) unless otherwise indicated.

Figure 1A:
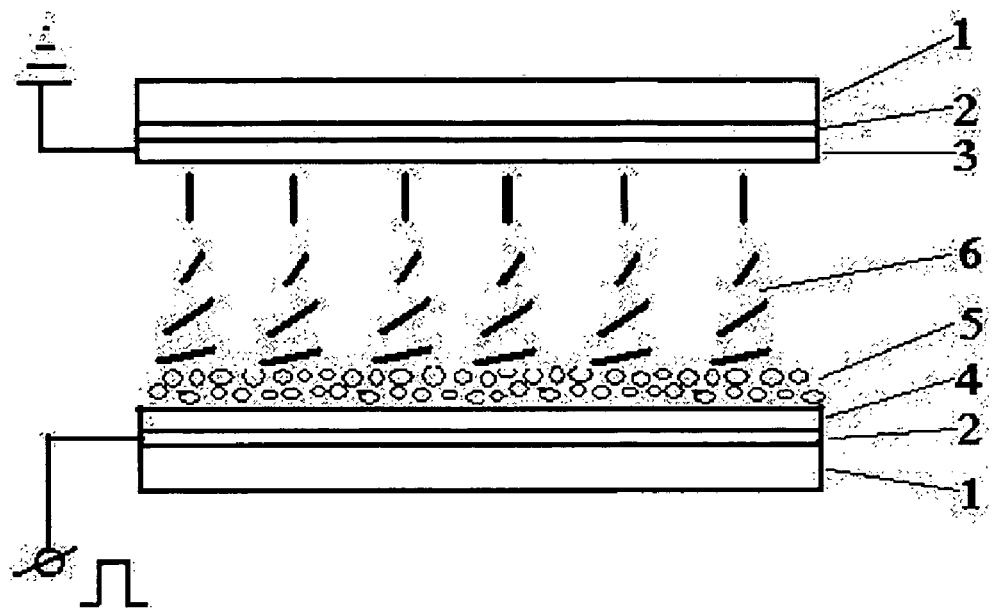
FIG. 1 schematically illustrates a bistable LCD in different optical states, in accordance with an embodiment of the present invention.

The display device shown in FIG. 1a comprises a pair of opposed transparent cell walls 1, in this example spaced 3 µm apart. The inner surface of each cell wall 1 is provided with a transparent electrode 2, for example ITO. The cell walls 1 enclose a layer of a nematic liquid crystal material 6, in this example, E63. The orientation of the local nematic director is represented schematically by the long axes of elongate rods in the LC material 6. The inner surface of the lower (first) cell wall 1 is also provided with a thin first alignment layer 4, which induces local planar alignment in adjacent molecules of the liquid crystal material. Any planar alignment known to those skilled in the art may be used, for example a rubbed polymer, photoaligned LPP layers, obliquely evaporated SiO, or a grating structure. In the present example, the alignment layer 4 was formed from rubbed polyimide. The inner surface of the upper (second) cell wall 1 is provided with a second alignment layer 3, which induces local homeotropic (vertical) alignment in adjacent molecules of the liquid crystal material. Any suitable homeotropic alignment layer 3 may be used, for example lecithin or a chrome complex. In the present example, a known chrome complex is used.

A network of nanoparticles 5 is deposited on the first alignment layer 4. In this example the nanoparticles are negatively charged silica particles, R812. The particles 5 are secured on the alignment layer and cannot migrate through the cell. The nanoparticles network 5 may be secured on the planar alignment layer 4 by any suitable means. In the present example the network 5 is created by a direct deposition of the dry nanoparticles, stacked on the surface. Stronger surface sticking is provided by using an additional layer (not shown) over the planar alignment layer 4, which is covered by the nanoparticles when in a soft state. Polymer LC RMM34 (Merck) was used to provide the sticky layer, which covers the planar alignment layer 4 and preserves the planar alignment properties. When soft, this layer provides good sticking of the nanoparticles. This state is fixed by UV treatment, providing photopolymerisation of the polymer LC layer with the stacked nanoparticles. Initially the polymer LC RMM34 is dissolved in butanone at a concentration of 5-30%. By spincoating the solvent is deposited over a rubbed polyimide layer. The concentration of the polymer LC and spincoating speed control the thickness of the spincoated polymer LC, which may vary between 50 nm and 2 μm. We used a layer with the thickness 50-300 nm. The sufficient quantity of the nanoparticles is placed over the soft polymer LC layer. After this UV treatment under nitrogen atmosphere provides polymerisation of the polymer LC, which strongly fixes the nanoparticles network over the planar surface. It should be noted that different layers and methods can be used for this process. Even a polyimide layer can be rubbed and covered with the nanoparticles in a soft state, and then will be polymerised under temperature.

In various experiments, the cell thickness has been varied between 2 and 15 μm by use of polymer beads. Commercial LCs from Merck have been used: E7, E63, ZLI2293, MLC6440, MLC6023-000, MLC6639, ZLI2222-000, ZLI2222-100, dye doped nematics ZLI3752, ZLI4756 (all with positive dielectric anisotropy) and ZLI4788 (with negative dielectric anisotropy). Negatively charged nanoparticles which have been used include: silica Aerosil R972, R974, R812, R711, R380, R202, OX50, titanium oxide T805 with primary size 7-40 nm and positively charged silica R504 (7 nm) and aluminium oxide C (13 mm) (all from Degussa-Huls).

Figure 1B:
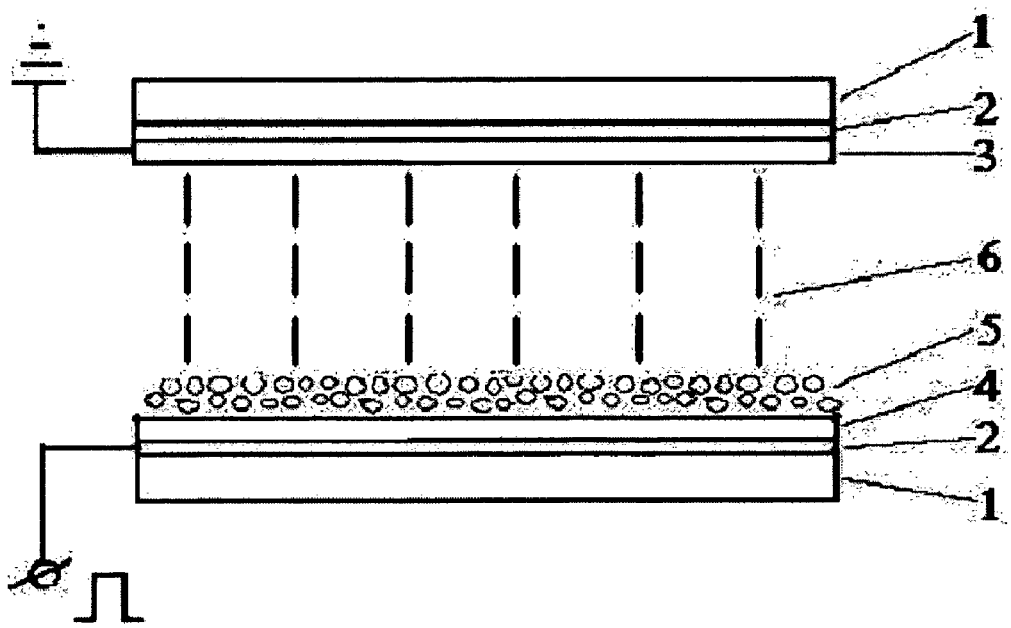
Figure 2A:
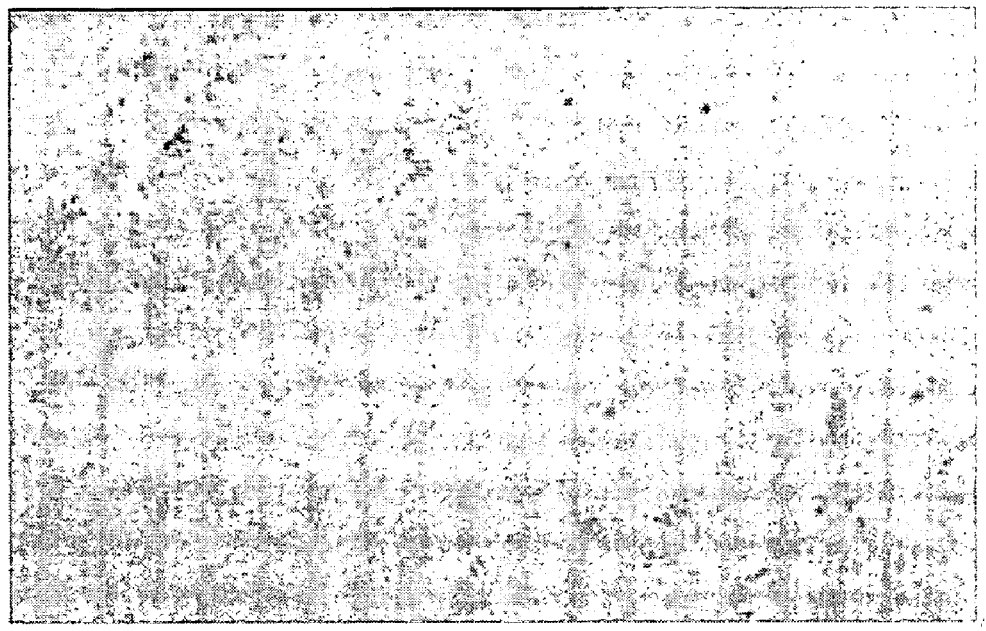
FIG. 2 shows photomicrographs of two stable states of the bistable LCD of FIG. 1.

The device of FIG. 1 is a homeoplanar (HAN) cell. In the configuration shown in FIG. 1a, the local LC alignment is planar at the planar alignment layer 4 and homeotropic at the homeotropic alignment layer 3. The orientation of the nematic director varies between the two extreme alignments a different points within the layer of LC material 6. Between crossed polarisers the cell's transmission is described by:

$$I_{out}=I_o \sin^2 2\alpha \sin^2(2\pi d\, \Delta n/\lambda).$$

where $I_o$=input light, $\alpha$=angle between input polarizer and director (orientation of LC molecules), d=cell thickness, $\Delta n$=optical anisotropy, $\lambda$=light wavelength. In the configuration shown in FIG. 1a the cell appears bright between crossed polarisers ($\alpha=45°$ with respect to the LC director—FIG. 2a).

Figure 2B:
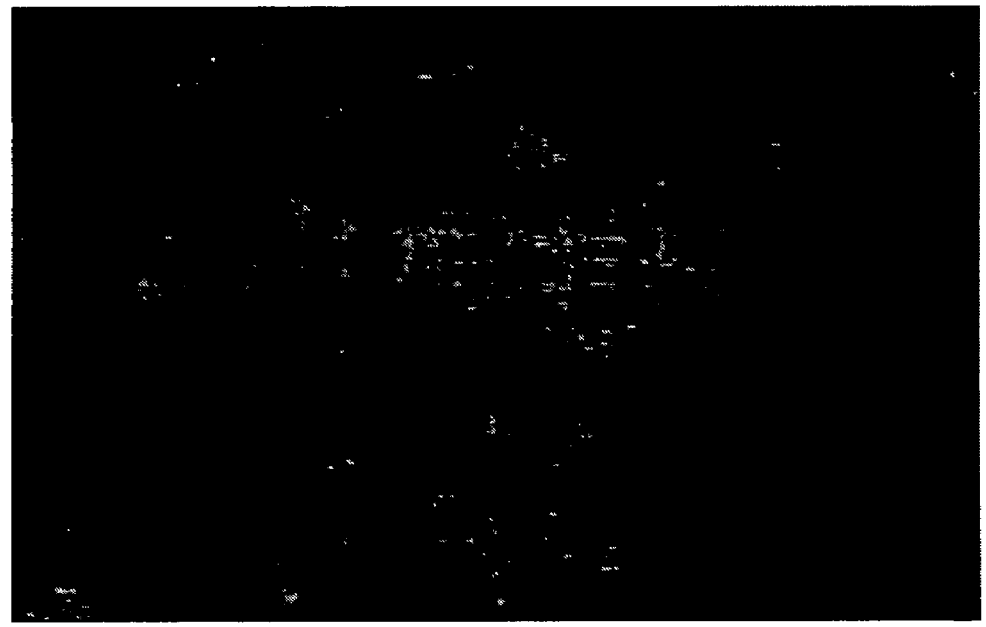

When a suitable amplitude of electric field with positive polarity is applied to the planar side with nanoparticles 5 the vertical state is retained after removal of the electric field. The cell now has homeotropic orientation across the whole bulk of the cell (FIG. 1b) and the cell appears dark through crossed polarisers (FIG. 2b). Applying a negative pulse produces back switching to the homeoplanar state (FIG. 1a). We believe that the silica nanoparticles acquire a negative charge in the LC medium caused by the formation of double layers. Initially, close to the planar surface, most of the LC molecules are orientated parallel to the plane of the substrate surface. The electrical pulse with positive polarity and sufficient amplitude produces full alignment of LC molecules along the electric field. This process also involves alignment of the LC molecules inside pores of the nanoparticles network 5 secured over the planar layer 4. It should be noted that the dielectric permittivity of the LC medium parallel to the electric field will be higher because the LC has positive dielectric anisotropy. The positive polarity of the electric pulse provides the appropriately directed electrical polarisation of the molecules, which results in a stronger interaction of the LC molecules with the solid nanoparticles network and consequently an increase of the double layers along the electric field. This stabilises the vertical alignment of the LC molecules after the removal of the electric field. The anisometric shape and intermolecular bonding of the LC molecules will support this state. The electrical interaction of the solid nanoparticles with the LC molecules created this way will be broken by application of a negative pulse and the LC molecules revert to a parallel state under strong planar anchoring.

Figure 3:
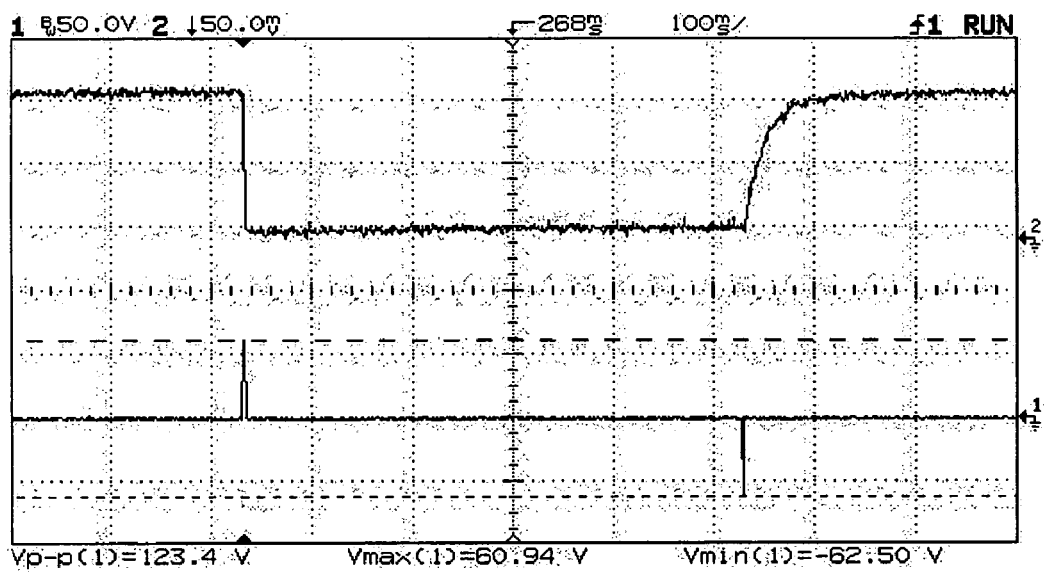
FIG. 3 shows graphs of electro-optical responses for the LCD of FIG. 1.

That switching is bistable is evident from FIG. 3, which shows electro-optic responses of the cell of FIG. 1. The upper curve shows optical transmission of the cell during bistable switching with unipolar electrical pulses. The lower curve records the applied electric pulses. Application of a positive pulse of suitable magnitude produces a dark state which persists until a negative pulse is applied. The negative pulse restores the bright state.

The bistable switching was analysed by measurement of Contrast Ratio $CR=(I_L-I_D)/I_D$, under a pair of unipolar pulses, where $I_D$ is the transmitted light intensity for the dark vertical state, provided by the pulse with sufficient parameters, $I_L$—the intensity of transmitted light for the switched (light) state, provided by a second pulse with opposite polarity.

Figure 4A:
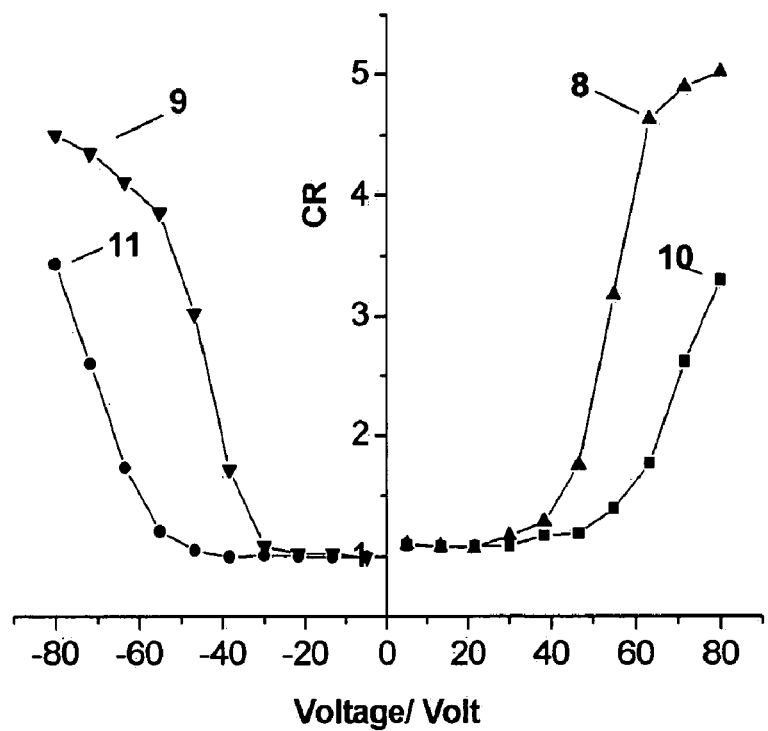
FIG. 4a is a graph showing contrast ratio -v- voltage for a fixed pulse length in the LCD of FIG. 1.

FIG. 4a shows a case where unipolar pulses of 1 ms (curves 8,9) and 0.5 ms (curves 10,11) duration with opposite polarity are applied to the cell. The curves 8, 10 plot contrast ratio for switching from the dark state to the light state, when the negative pulse with constant parameters 80 V & 1 ms (curve 8) and 80 V & 0.5 ms (curve 10), provides switching to the vertical dark state and a positive pulse with increased amplitudes up to 80 V, provides the opposite switching. The other curves 9, 11 plot contrast ratio for switching from the light to the dark state, when a positive pulse has the same constant parameters, providing switching to the homeoplanar (light) state and negative pulses change amplitudes from −5 to −80 V.

Figure 4B:
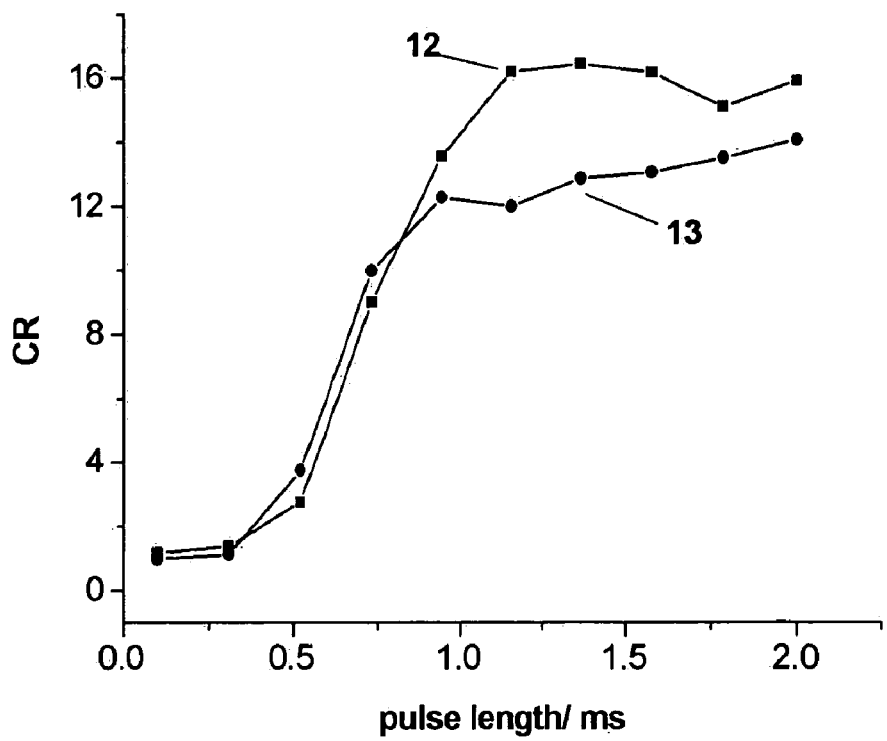
FIG. 4b is a graph showing contrast ratio -v- pulse length for a fixed voltage in the LCD of FIG. 1.

The same switching is observed when pulse length is changed instead of the amplitude. FIG. 4b shows graphs of contrast ratio against pulse length for fixed 80 V amplitude. Curves 12 and 13 respectively show the switching for reversed polarity of the electrical pulses. The curve 12 displays switching from dark to light state, when to the cell are applied negative pulses with constant parameters 80 V & 1 ms, providing switching to the vertical state and positive pulses 80 V with varied length 0.1-2 ms, providing back switching. The curve 13 shows the case of the reversed polarity of the pulses, providing switching from the light state to the dark state.

Figure 5:
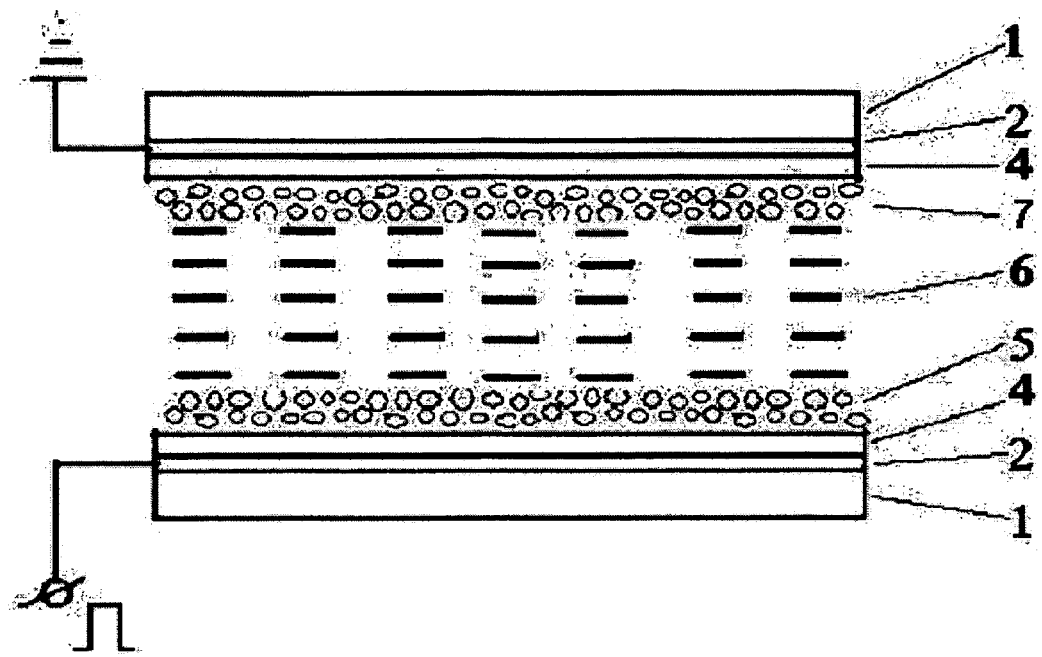
FIGS. 5 and 6 show schematic sectional views of bistable LCDs in accordance with further embodiments of the present invention.
Figure 6:
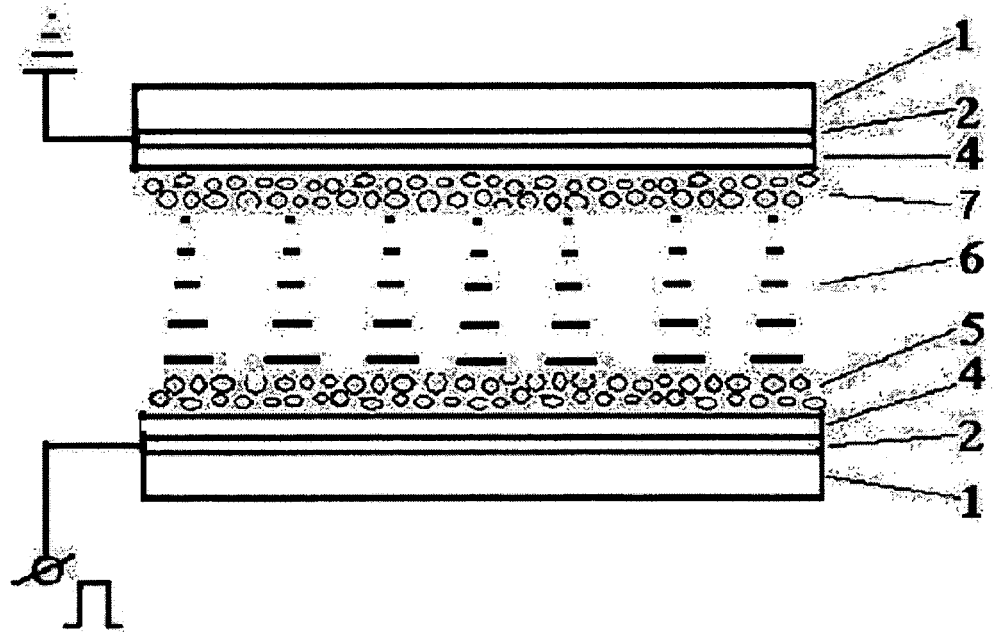

Turning now to FIGS. 5 and 6, two alternative embodiments of the present invention are illustrated. The cell of FIG. 5 differs from the cell of FIG. 1 in two principal ways. A second planar surface alignment layer 4 is provided on the inner surface of the upper (second) cell wall 1 instead of a homeotropic alignment layer. Also, the second planar alignment layer is covered by a layer of positively charged nanoparticles 7 which are immobilized on the planar surface. The planar alignment layers 4 are parallel and induce the nematic director to be uniformly planar throughout the cell. The cell switches to a vertical state when the negative and positive nanoparticle-covered substrates are respectively connected to the plus and minus signs of the electrical pulse. Reversing the electrical pulse polarity results in back-switching to the initial planar state. The cell of FIG. 6 is similar, but the upper (second) planar surface alignment 4 is normal to the lower (first) planar surface alignment. This arrangement results in a twisted initial state. Bistable switching occurs between the twisted and vertical alignment states depending on the polarity of an applied electric field in a manner similar to the cell of FIG. 5.

Figure 7:
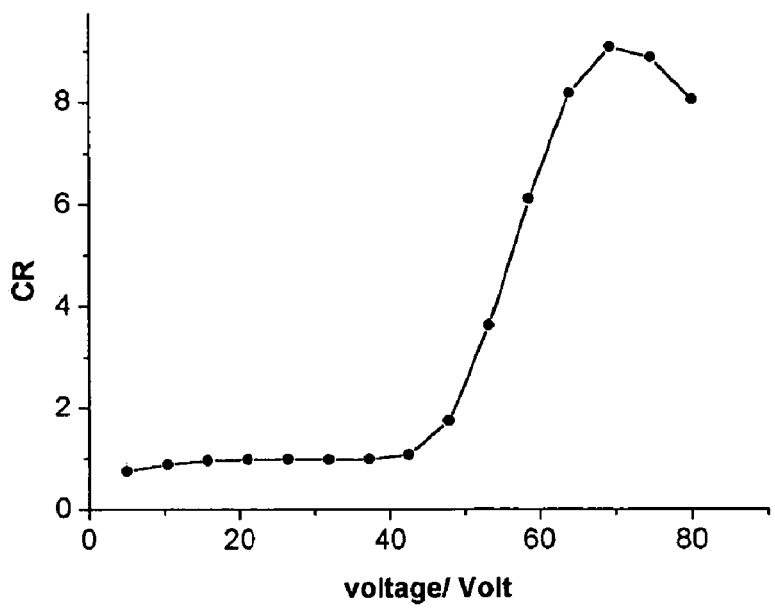
FIGS. 7 and 8 are graphs of contrast ratio against, respectively, voltage and pulse length for a device in accordance with another embodiment of the invention.

FIG. 7 shows a case where unipolar pulses of 2 ms duration with opposite polarity are applied to the planar cell. One planar surface with rubbed polyimide layer are covered by silica R812 nanoparticles, acquired negative charge, the opposite planar surface is covered by silica R504, acquired positive charge. The cell is filled with nematic LC MLC6440. The thickness of the cell is 3 μm. The curves plot contrast ratio for switching from the dark state to the light state, when the negative pulse with constant parameters 80 V & 2 ms, provides switching to the vertical dark state and a positive pulse with increased amplitudes up to 80 V, provides the opposite switching to the light state.

Figure 8:
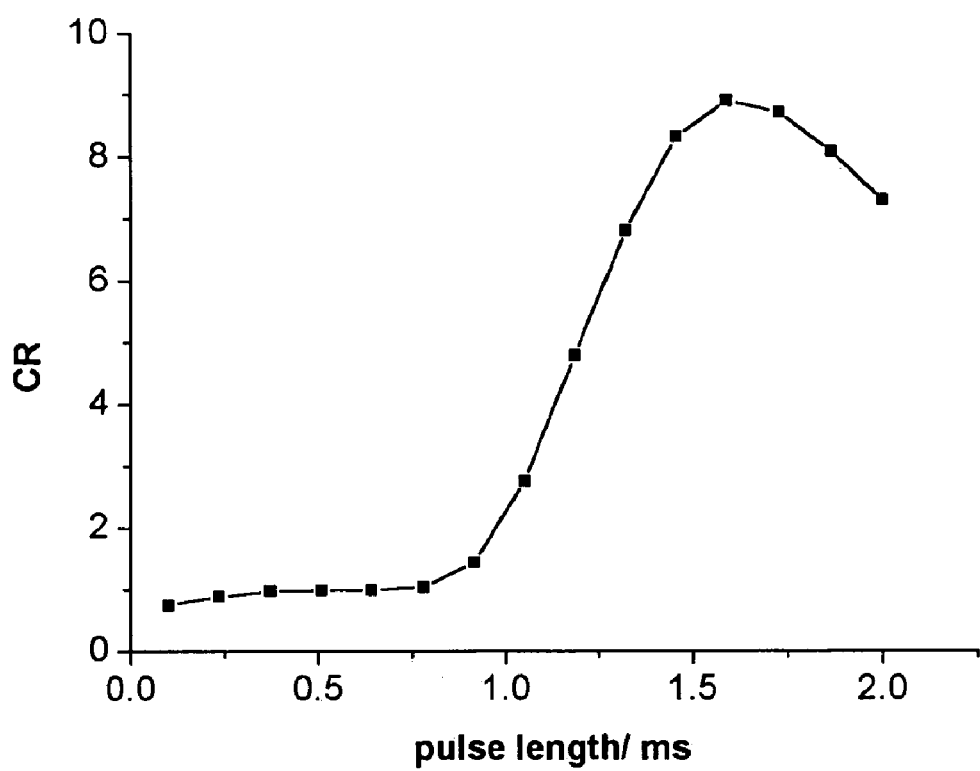

The same switching is observed when pulse length is changed instead of the amplitude. FIG. 8 shows graphs of contrast ratio against pulse length for fixed 80 V amplitude. A curve show the switching for reversed polarity of the electrical pulses. The curve displays switching from dark to light state, when to the cell are applied negative pulses with constant parameters 80 V & 2 ms, providing switching to the vertical state and positive pulses 80 V with varied length 0.1-2 ms, providing back switching. As follows from the figures the cell provides switching in the time range about 1 ms. It should be noted that the optimal fast switching is achieved when the electrical pulse providing back switching, has less amplitude (FIG. 6) or duration (FIG. 7) than the electrical pulse, providing switching to the vertical state. We suppose that higher amplitude and longer length of the opposite pulse can again orient the LC molecules vertically, which hinders to provide fast back switching with high optical contrast.

In a further alternative embodiment, both nanoparticles layers 5, 7 could have nanoparticles which acquire a charge of the same sign and the planar alignments 4 could be at 45° (or any other desired angle) to each other. Depending on the polarity of an applied pulse, the cell switches between two HAN modes at 45° to each other.

The invention provides a bistable display in which the optical states are simply electrically addressed and in which the two states exhibit very different molecular alignments.

The indefinite articles 'a' and 'an' are used herein to denote 'one or more' unless the context otherwise dictates.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the spirit and scope of the present invention specified in the claims.

What is claimed is:

1. A bistable nematic liquid crystal display device comprising:
    a first cell wall and a second cell wall enclosing a layer of nematic liquid crystal material;
    at least one electrode on each cell wall for applying an electric field across at least some of the liquid crystal material;
    a first surface alignment on an inner surface of at least part of the first cell wall for inducing adjacent molecules of the liquid crystal material to adopt a desired orientation; and
    a layer of solid particles secured over the first surface alignment on an inner surface of the first cell wall in which the solid particles bond with surrounding liquid crystal molecules in such a manner that it stabilizes a locally induced alignment of the liquid crystal material;
    whereby the nematic liquid crystal material will adopt a first stable molecular configuration in response to a first pulse of a unidirectional electric field of suitable magnitude and duration and will adopt a second stable molecular configuration in response to a second pulse of unidirectional electric field of suitable magnitude and duration and opposite polarity to the first pulse, the second configuration being different from the first configuration.

2. A device according to claim 1, wherein said particles have a size in the range 1-1000 nm.

3. A device according to claim 1, wherein said particles have a size in the range 5-50 nm.

4. A device according to claim 1, wherein said first surface alignment tends to induce adjacent molecules of the liquid crystal material to adopt a planar alignment.

5. A device according to claim 4, further including a second surface alignment on an inner surface of at least part of the second cell wall for inducing adjacent molecules of the liquid crystal material to adopt a homeotropic alignment.

6. A device according to claim 5, further including a second layer of solid particles secured over the second surface alignment on an inner surface of the second cell wall.

7. A device according to claim 6, wherein particles in one of the layers acquire a charge opposite in sign to particles in the other of the layers.

8. A device according to claim 4, further including a second surface alignment on an inner surface of at least part of the second cell wall for inducing adjacent molecules of the liquid crystal material to adopt a planar alignment substantially parallel to the alignment induced by the first surface alignment.

9. A device according to claim 4, further including a second surface alignment on an inner surface of at least part of the second cell wall for inducing adjacent molecules of the liquid crystal material to adopt a planar alignment at a nonzero angle to the alignment induced by the first surface alignment.

10. A device according to claim 9, wherein said nonzero angle is substantially 90°.

11. A device according to claim 1, wherein said layer of solid particles is secured over the first surface alignment by means of a UV-curable adhesive.

12. A device according to claim 11, wherein said UV-curable adhesive is a liquid crystal polymer.

13. A device according to claim 1, wherein said particles comprise silica, titanium oxide or alumina.

14. A device according to claim 1, wherein said liquid crystal material has positive dielectric anisotropy.

15. A bistable nematic liquid crystal display device comprising two opposed cell walls enclosing a layer of a nematic liquid crystal material, an inner surface of each cell wall being provided with an electrode for applying an electric field across at least some of the liquid crystal material; wherein an inner surface of one of the cell walls is provided with a surface alignment capable of inducing a desired alignment in adjacent molecules of the liquid crystal material, and a layer of finely-divided charged particles is immobilized on said surface alignment.

16. A bistable nematic liquid crystal display device comprising:
  a first cell wall and a second cell wall enclosing a layer of nematic liquid crystal material;
  at least one electrode on each cell wall for applying an electric field across at least some of the liquid crystal material;
  a first surface alignment on an inner surface of at least part of the first cell wall for inducing adjacent molecules of the liquid crystal material to adopt a planar alignment;
  a second surface alignment on an inner surface of at least part of the second cell wall for inducing adjacent molecules of the liquid crystal material to adopt a homeotropic alignment or a planar alignment; and
  a layer of finely-divided charged solid particles having a size in the range 1 to 1000 nm immobilized on the first surface alignment and in contact with the liquid crystal material;
  whereby the nematic liquid crystal material will adopt a first stable molecular configuration in response to a first pulse of a unidirectional electric field of suitable magnitude and duration and will adopt a second stable molecular configuration in response to a second pulse of unidirectional electric field of suitable magnitude and duration and opposite polarity to the first pulse, the second configuration being optically-distinguishable from the first configuration.

17. A bistable nematic liquid crystal display device comprising:
  a first substrate means and a second substrate means enclosing a layer of nematic liquid crystal material;
  electrode means on each substrate means for applying an electric field across at least some of the liquid crystal material;
  first surface alignment means on an inner surface of at least part of said first substrate means for inducing adjacent molecules of said liquid crystal material to adopt a planar alignment;
  second surface alignment means on an inner surface of at least part of said second substrate means for inducing adjacent molecules of said liquid crystal material to adopt a homeotropic alignment or a planar alignment; and
  a layer of finely-divided charged solid particles having a size in the range 1 to 1000 nm immobilized on said first surface alignment by adhesive means and in contact with said liquid crystal material;
  whereby said nematic liquid crystal material will adopt a first stable molecular configuration in response to a first pulse of a unidirectional electric field of suitable magnitude and duration and will adopt a second stable molecular configuration in response to a second pulse of unidirectional electric field of suitable magnitude and duration and opposite polarity to said first pulse, said second configuration being optically-distinguishable from said first configuration.

18. A device according to claim 17, wherein said adhesive means comprises a UV-curable adhesive material.

19. A cell wall for use in the manufacture of a liquid crystal display device, said cell wall comprising a sheet of material having an electrode on at least a part of a first surface thereof, a surface alignment on at least a part of said first surface, and a layer of finely-divided charged particles immobilized on said surface alignment.

20. A method of manufacturing a bistable liquid crystal display device, comprising:
  taking a first cell wall comprising a sheet of material having an electrode on at least a part of a first surface thereof, a surface alignment on at least a part of said first surface, and a layer of finely-divided charged particles immobilized on said surface alignment;
  spacing said first cell wall apart from a second cell wall having an electrode on at least a part of a surface thereof to form a cell having electrodes on both inner-facing cell walls, filling said cell with a nematic liquid crystal material and sealing said cell.

* * * * *